UNITED STATES PATENT OFFICE.

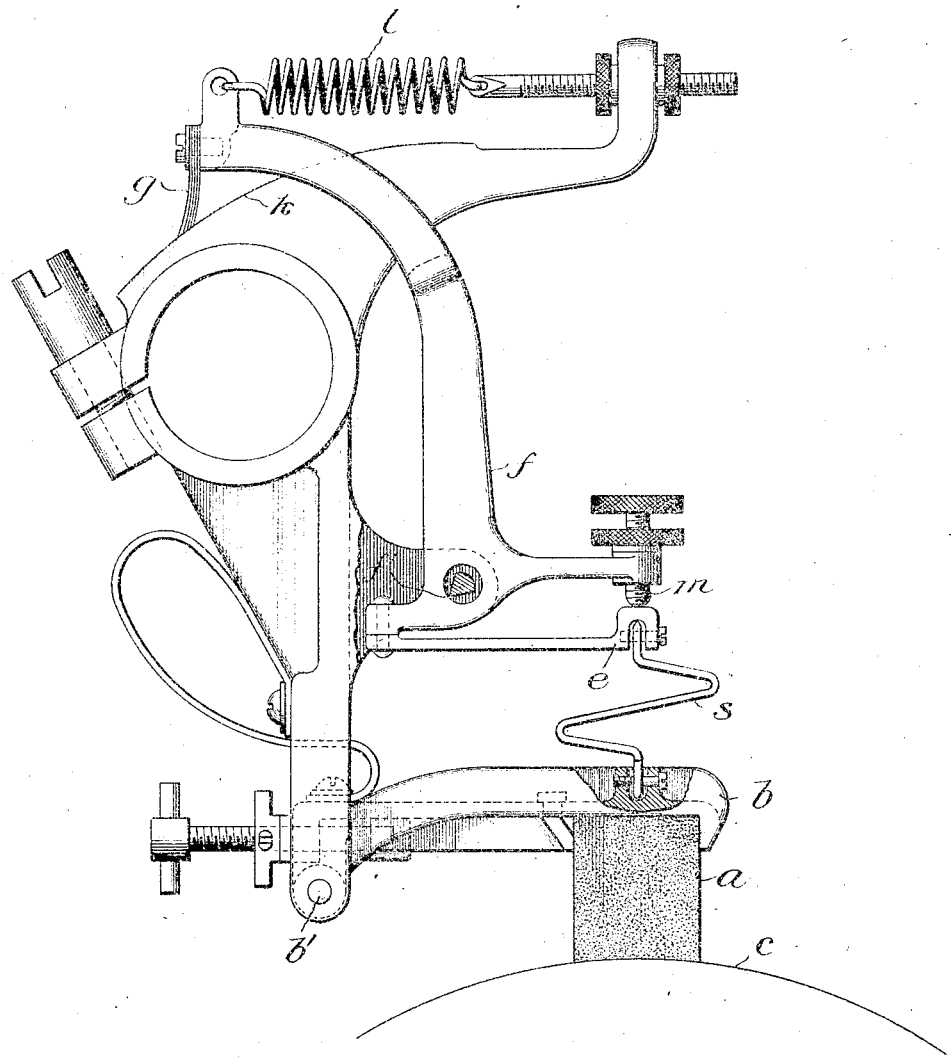

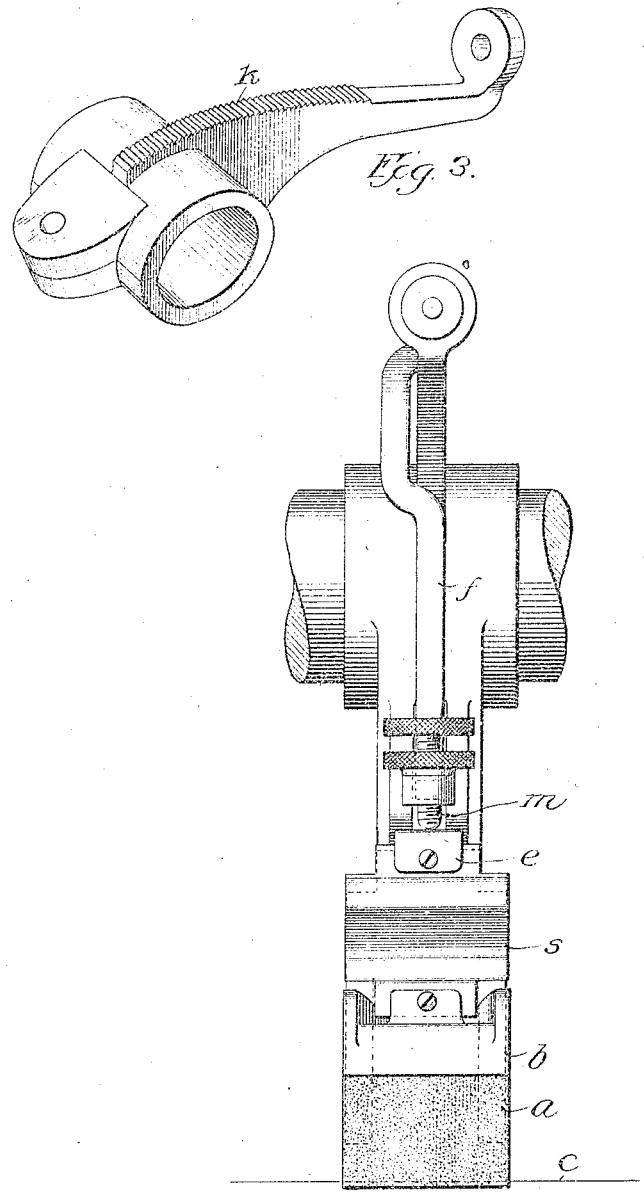

CHARLES H. SMOOT, OF CHICAGO, ILLINOIS, ASSIGNOR TO RATEAU TURBINE COMPANY, OF CHICAGO, ILLINOIS, A CORPORATION OF WEST VIRGINIA.

BRUSH-HOLDER FOR DYNAMOS.

1,003,817.  Specification of Letters Patent.  Patented Sept. 19, 1911.

Application filed December 14, 1906. Serial No. 347,825.

*To all whom it may concern:*

Be it known that I, CHARLES H. SMOOT, a citizen of the United States, residing at Chicago, in the county of Cook and State of Illinois, have invented a certain new and useful Improvement in Brush-Holders for Dynamos, of which the following is a full, clear, concise, and exact description.

My invention relates to a brush holder for dynamo electric machines, such as generators and motors, whether of the alternating or direct current type, and is more particularly intended for use on high speed machines, such as those which are direct-driven by steam turbines, and run at several thousand revolutions per minute. These high speed machines are very dependent for their successful operation upon the perfection of the surface of the commutator or collector, and of the contact between such surface and the brushes. In such machines it is an extremely difficult matter to keep the brushes continuously in contact with the commutator or collector surface, because inequalities in the surface tend to make the brushes jump off the commutator and stay out of contact a sufficient time to cause sparking.

As in ordinary types of machines, it is desirable to use carbon brushes, because they aid in securing sparkless operation, and the effects of sparking are less destructive in case any should occur. Difficulties have heretofore been experienced in using carbon brushes on high speed commutators on account of the impossibility of keeping the commutator or collecting surface absolutely true; and if it is not true the carbon brushes, when used in any of the ordinary forms of brush holder heretofore proposed, will be knocked out of contact with the commutator by exceedingly slight surface irregularities, and thus give rise to sparking as above described. If an attempt is made to make the brushes stay in contact with the revolving surface of the commutator or collector by applying a very heavy pressure to them, the friction caused by the rubbing of the brushes at the very high peripheral speeds employed will cause both the commutator and brushes to become too hot. This will be apparent when it is understood that a peripheral speed of 8000 feet per minute for the commutator is desirable for turbo-generators.

The present invention provides a means whereby the brushes may be maintained in continuous good contact with the commutator or collector at the high speeds employed, following with the necessary rapidity any slight variations or irregularities in the rotating collector surface.

Broadly, the invention contemplates a contact brush of small inertia bearing on the collector, and a very stiff spring of great strength acting upon the brush and adjusted to normally press with only average tension thereon, the spring, however, having a natural period of vibration considerably higher than the frequency of rotation of the collector, and being of such stiffness that its tension is very greatly increased by only the minute compression due to such small irregularities of the collector surface as are ordinarily met with in practice. Thus, in practice, the spring will be of such a stiffness that a compression thereof due to an eccentricity of two-tenths of one per cent. in the collector surface will approximately double the spring pressure. The natural range of motion of such a spring will be equal to only a few times the ordinary eccentricity of the collector.

Another feature of my invention is a provision for causing such a spring to "follow up" the advance of the brush as the latter wears away, so as to maintain an approximately constant minimum tension.

The invention also consists in certain details of construction of a brush holder having the general characteristics above described. Such a brush holder is shown in the accompanying drawings, in which—

Figure 1 is a side elevation of the mechanism taken transversely to the axis of the commutator; Fig. 2 is a view of the brush holder mechanism taken at right angles to Fig. 1; and Fig. 3 is a perspective view of the mechanism for preventing the retraction of the spring supporting arm hereinafter described.

The same letters of reference indicate the same parts in both views.

The surface of the rotating commutator (or collector ring) is indicated by the arc $c$. The carbon brush $a$ is held in a movable holder or clamp $b$ pivoted at $b^1$ to the frame of the brush holder mechanism, which is intended to be attached in the usual manner to the rocker arm (not shown) of the machine. The carbon brush and its pivoted holder are of slight inertia, so that the brush may be vibrated very rapidly to follow the irregularities of the rotating commutator surface. Such responsiveness of the brush and holder is secured by means of the stiff spring $s$ which is suitably supported and arranged to act upon the carbon brush, or what amounts to the same thing, upon the movable holder $b$ in which said brush is held.

As shown, the spring $s$ is a short piece of flat spring steel or bronze bent into a wave form, with its ends turned out in opposite directions, the lower end of the spring being seated in the upper surface of the pivoted holding clamp $b$, and the upper end of said spring being similarly seated in a supporting arm $e$ attached to the frame of the apparatus. Means are provided whereby the support of the spring is caused to follow up the gradual advance of the brush and its holding clamp, due to the wearing away of said brush and of the collector surface. As shown in the drawing, such means consists of the ratchet arrangement connected with a movable support of the spring $s$ and operating to prevent the recession of the spring holder after it has advanced, or in other words to slip forward when the tension is a minimum, and thus to follow up the spring in such a way as to maintain the same average minimum tension. Thus the support $e$ in which the upper end of the spring $s$ is seated is carried by and forms in effect one arm of a bell crank lever $f$ pivoted upon a knife edge bearing $f^1$ upon the frame of the apparatus, the other arm of said bell crank lever extending upwardly and carrying at its end a brush $g$ of flat metal strips acting as a pawl upon a curved surface $k$ of the framework. Said surface $k$ is slightly roughened, so that the metal strips $g$, which are inclined at an angle to said surface, as shown, will slide over the surface freely in one direction, but will not slide in the other direction, the brush $g$ and roughened surface $k$ acting as a pawl and ratchet.

The spring $l$, which is provided with means for adjusting its tension, is connected to the upwardly extending arm of the bell crank lever $f$, and tends to move said arm in a direction to follow up the spring $s$ as the brush $a$ wears away. An approximately constant minimum tension can thus be maintained in spite of the wearing away of the brush and commutator, and if the commutator is eccentric, the stiff spring will act to maintain the pressure requisite to prevent the brush from being knocked off the commutator at the high spots.

The maximum pressure of the spring $s$ may be controlled by means of an adjusting screw $m$ mounted in the horizontal extension of the bell crank lever in such position that the supporting arm $e$ in which the upper end of the spring $s$ is seated rests directly against the end of said adjusting screw.

In another application, Serial No. 347,826 filed December 14th, 1906, I have described and claimed another specific means for following up the stiff spring as the brush wears away, such means consisting of an inertia weight upon which the stiff spring is seated, but in the present application I wish to claim broadly any means for following up the stiff spring to maintain the average minimum pressure upon the brush, as well as the specific ratchet device here shown. So far as I am aware, however, I am the first to employ a brush holder for high speed dynamos in which a brush of small inertia is acted upon by a short stiff spring having a very high natural period of vibration, greater than the frequency of rotation of the collector, and having a very great increase in tension when compressed by a very slight eccentricity of the commutator.

In the brush holder shown the stiffness of the spring may be such that the natural period of vibration of the moving system comprising the carbon, the holding clamp and the spring would be ninety five hundred complete vibrations per minute. A spring having a stiffness of seven hundred pounds per inch of deflection would give good results. In general, the spring should increase its tension approximately twenty per cent. or more upon a compression due to irregularities of the collector surface as small as .002 of an inch.

By having the contact brush of small inertia acted upon by a stiff spring, such as above described, the brush is caused to respond to variations in the collector surface so as to maintain a good contact continuously in spite of slight irregularities or eccentricities of the surface; this being secured without maintaining an excessive average pressure of the brush against the commutator. These conditions, moreover, are maintained as the commutator or collector surface wears away, the ratchet device slipping forward to follow up the spring and maintain an approximately constant minimum tension thereof.

It will be evident that my invention is applicable to alternators, as well as to direct current machines, and in the claims I therefore use the term collector to mean either a commutator or a continuous collecting ring.

I claim:

1. The combination with a commutator brush and its holder, of a spring of great strength and stiffness acting upon said brush, a movable backing or support for said stiff spring; a second spring acting upon said support to maintain an average pressure upon said stiff spring and the brush actuated thereby, said backing or support having means adapted to follow up the advance of said support and oppose any sudden recession thereof by a resistance additional to the tension of the second-mentioned spring.

2. The combination with a high speed rotary collector, of a contact brush bearing thereon, a brush-holder frame, a brush holding clamp of slight inertia in which said brush is secured, a movable spring support movably mounted on said frame and a compression spring of great strength and stiffness acting between said support and said holding clamp.

3. The combination with a high speed rotary collector, of a contact brush bearing thereon, a movable holding clamp of slight inertia in which said brush is secured, a movable spring support, a compression spring of great strength and stiffness acting between said support and said holding clamp, and a ratchet device adapted to move said spring support to follow up the advance of the spring as the brush or the collector wears away.

4. In a brush holder for high speed dynamos, the combination with a pivoted holding clamp in which the carbon brush is adapted to be secured, said clamp being of slight inertia, of a bell crank lever, a short stiff compression spring acting between one arm of said bell crank lever and said movable holding clamp, a ratchet device connected with the other end of said bell crank lever and adapted to permit said lever to advance in a direction to follow up said spring while preventing recession thereof, and a spring $l$ normally tending to advance said lever against the tension of said compression spring.

5. The combination with a collector, of a brush bearing thereon, a pivoted arm by which said brush is carried, a spring acting upon said brush, a support for said spring relatively movable with respect to said arm, automatic means for adjusting said support to maintain an approximately constant minimum pressure of the spring upon said brush, and independent means for adjusting the maximum spring pressure.

In witness whereof, I, hereunto subscribe my name this 8th day of December A. D., 1906.

CHARLES H. SMOOT.

Witnesses:
DE WITT C. TANNER,
ALFRED H. MOORE.